United States Patent
Hawley et al.

(10) Patent No.: US 11,267,402 B1
(45) Date of Patent: Mar. 8, 2022

(54) SYSTEMS AND METHODS FOR PRIORITIZING DRIVER WARNINGS IN A VEHICLE

(71) Applicant: Ford Global Technologies, LLC, Dearborn, MI (US)

(72) Inventors: Taylor Hawley, Dearborn, MI (US); Jeremy Lerner, Southfield, MI (US); Nicholas Frazier, Ann Arbor, MI (US); Joseph Gifford, Ferndale, MI (US); Jason Woo, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/008,628

(22) Filed: Aug. 31, 2020

(51) Int. Cl.
*B60Q 9/00* (2006.01)
*G08G 1/16* (2006.01)
*G08G 1/01* (2006.01)

(52) U.S. Cl.
CPC ............. *B60Q 9/00* (2013.01); *G08G 1/0129* (2013.01); *G08G 1/166* (2013.01)

(58) Field of Classification Search
CPC ......... B60Q 9/00; G08G 1/0129; G08G 1/166
USPC ....................................................... 340/905
See application file for complete search history.

(56) References Cited

U.S. PATENT DOCUMENTS

| | | | |
|---|---|---|---|
| 6,526,352 B1 | 2/2003 | Breed et al. | |
| 10,157,539 B1 * | 12/2018 | Hoover | G08G 1/0112 |
| 2006/0162985 A1 * | 7/2006 | Tanaka | B60W 40/04 180/279 |
| 2016/0272215 A1 * | 9/2016 | Laine | B60W 50/14 |
| 2016/0357187 A1 | 12/2016 | Ansari et al. | |
| 2018/0130353 A1 * | 5/2018 | Pandurangarao | G08G 1/164 |
| 2101/9018501 | 6/2019 | Tao et al. | |
| 2019/0212749 A1 | 7/2019 | Chen et al. | |
| 2019/0259284 A1 * | 8/2019 | Khadloya | G06T 7/97 |
| 2019/0287401 A1 | 9/2019 | Aoude et al. | |
| 2020/0128372 A1 * | 4/2020 | Zhang | H04W 4/12 |

OTHER PUBLICATIONS

Zantalis, et al., "A Review of Machine Learning and IoT in Smart Transportation", Future Internet 2019, vol. 11, No. 94 (23 pages).
Jung, et al., "Vision-Based Blind Spot Monitoring Using Rear-View Camera and Its Real-Time Implementation in an Embedded System," Journal of Computing Science and Engineering, vol. 12, No. 3, Sep. 1018, pp. 127-138.

* cited by examiner

*Primary Examiner* — Omeed Alizada
(74) *Attorney, Agent, or Firm* — Brandon Hicks; Eversheds Sutherland (US) LLP

(57) ABSTRACT

The disclosure is generally directed to systems and methods for prioritizing driver warnings in a vehicle. In one example, a first sensor in the vehicle may detect a first driving event, such as, for example, another vehicle that is traveling in a blind spot of the driver. A second sensor in the vehicle may detect a second driving event, such as, for example, that the driver of the vehicle is tailgating another vehicle. A driver warning system in the vehicle produces a driver warning based on prioritizing one of the two driving events. For example, the driver warning system may prioritize a warning pertaining to the tailgating action over a warning pertaining to the vehicle moving in the blind spot. In some cases, the prioritization may be carried out by using historical information about the two driving events.

20 Claims, 6 Drawing Sheets

SYSTEMS AND METHODS FOR PRIORITIZING DRIVER WARNINGS IN A VEHICLE

BACKGROUND

Modern vehicles typically include sensors/detectors that issue various types of warnings to a driver. In some cases, the warnings may be issued in the form of audible signals. In other cases, the warnings may be issued in the form of images or text upon a display screen. In yet other instances, the warnings may be issued in the form of a haptic signal—such as a vibration in the steering wheel, for example.

It is desirable to have systems and methods for prioritizing the driver warnings in a vehicle.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
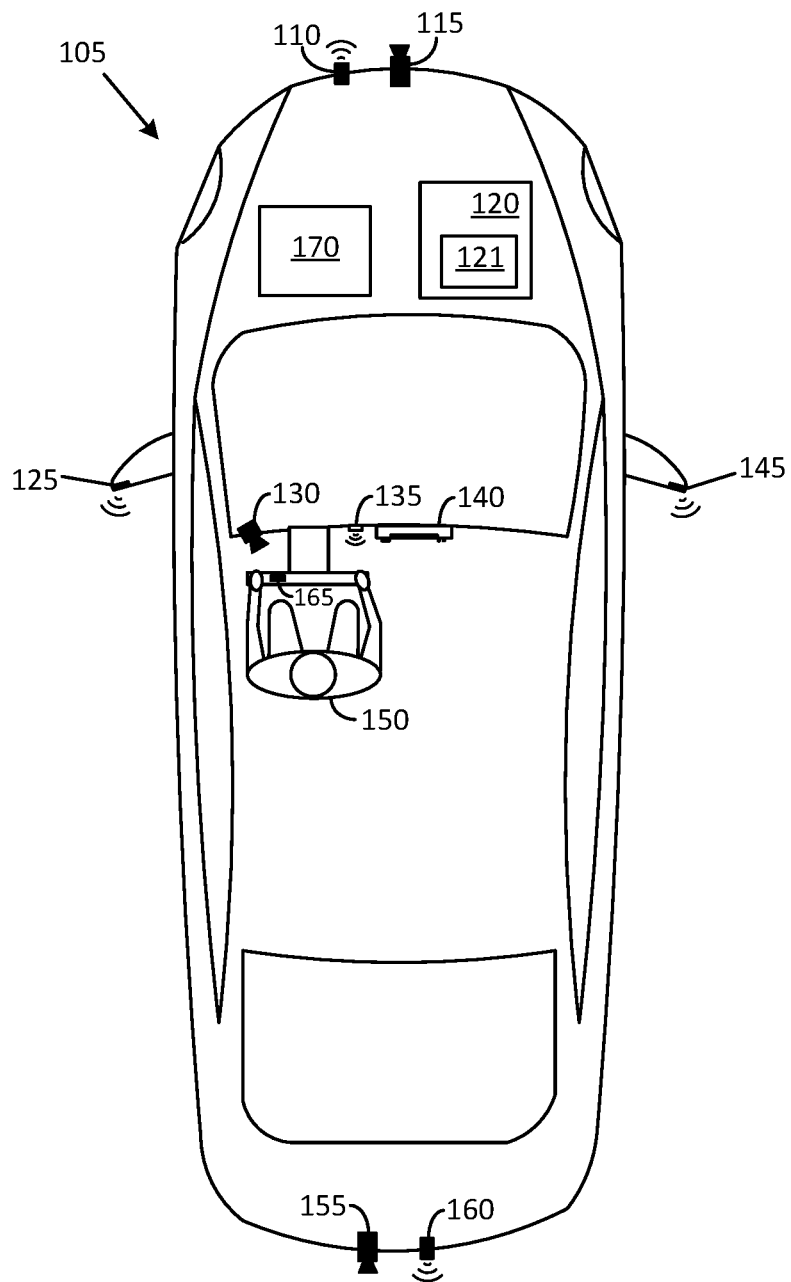
FIG. 1 illustrates an example driver warning system provided in a vehicle in accordance with an embodiment of the disclosure.

In terms of a general overview, embodiments described in this disclosure are directed to systems and methods for prioritizing driver warnings in a vehicle. In one driving scenario example, a first sensor in the vehicle may detect a first event, such as, for example, another vehicle that is traveling in a blind spot of the driver. A second sensor in the vehicle may detect a second event, such as, for example, that the driver of the vehicle is tailgating another vehicle. A driver warning system in the vehicle may produce a driver warning based on prioritizing one of the two events within the driving scenario. In the example described above, the driver warning system may prioritize a warning pertaining to the tailgating action over a warning pertaining to the other vehicle moving in the blind spot. In some instances, the prioritization may be carried out by using historical information about the two events within the driving scenario. The historical information may be obtained via crowdsourcing in some implementations.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "sensor" may be used interchangeably with the word "detector." Either word as used in this disclosure refers to various devices, such as an ultrasonic sensor that may be used to detect an object by using ultrasonic waves, a radar detector that may be used to detect an object by using radar signals, and an imaging device, such as a camera that is used to capture an image (or a video clip) of an object for image processing by an image processing element to detect the object. The word "data" may be used interchangeably with the word "information." Either word pertains to any of various forms of input to a processor. The word "condition" may be used interchangeably with words, such as "situation" and "scenario." It should be understood that the word "example" as used herein is intended to be non-exclusionary and non-limiting in nature.

FIG. 1 illustrates an example driver warning system 120 provided in a vehicle 105 in accordance with an embodiment of the disclosure. The vehicle 105 may be any of various types of vehicles that include various sensors and detectors for detecting various types of events that may be encountered by a driver 150 when operating the vehicle 105. A few example sensors that may be provided in the vehicle 105 may include a rear-facing camera 155 mounted upon a trunk portion of the vehicle 105, a radar sensor 160 mounted upon a rear bumper of the vehicle 105, a front-facing camera 115 mounted upon a hood portion of the vehicle 105, a radar sensor 110 mounted upon a front bumper of the vehicle 105, an ultrasonic sensor 125 mounted upon a driver-side rear-view mirror, an ultrasonic sensor 145 mounted upon a passenger-side rear-view mirror, and a camera 130 mounted upon the front windshield of the vehicle 105 and facing the driver 150 of the vehicle 105.

The vehicle 105 may further include components, such as, for example, a vehicle computer 170, an infotainment system 140, and a beeper 135. These components may be communicatively coupled to the driver warning system 120. The vehicle computer 170 may perform various functions of the vehicle 105, such as controlling engine operations (fuel injection, speed control, emissions control, braking, etc.), managing climate controls (air conditioning, heating etc.), activating airbags, and issuing warnings (check engine light, bulb failure, low tire pressure, etc.). The vehicle computer 170 may also provide various type of information to the driver warning system 120, such as certain actions performed by the driver 150. For example, the vehicle computer 170 may monitor the fuel injection system and/or a braking system of the vehicle 105 to determine that the driver 150 is executing a braking operation upon the vehicle 105. The braking operation can be intimated to the driver warning system 120 in response to a request from the driver warning system 120.

The infotainment system 140 may include a combination of various entertainment devices (such as a radio, streaming audio solutions, and USB access ports for digital audio devices) with elements, such as a navigation system that provides navigation instructions and maps upon a display screen of the infotainment system 140.

The various sensors are communicatively coupled to the driver warning system 120 and configured to provide signals that may be processed by a processor 121 for evaluating various events within a driving scenario. For example, the radar sensor 160 and/or the radar sensor 110 may provide signals to the driver warning system 120 upon detecting another vehicle traveling closely to the vehicle 105. The processor 121 may evaluate these signals and decide to warn the driver 150 by transmitting audio beeps through the beeper 135, and/or a warning message that may be flashed upon a display screen of the infotainment system 140 advising the driver 150 to switch lanes, for example.

As another example, the front-facing camera 115 and/or the rear-facing camera 155 may provide images to the driver warning system 120 that are examined by the processor 121 to detect any event that warrants providing a warning to the driver 150. In one implementation, the front-facing camera 115 and/or the rear-facing camera 155 may provide the images to the driver warning system 120 in the form of a video stream. The processor 121 may evaluate the video stream in real time to identify any event that warrants issuing a warning to the driver 150.

As yet another example, the ultrasonic sensor 125 mounted upon the driver-side rear-view mirror may detect another vehicle located in a driver-side blind spot and provide signals to the driver warning system 120. The processor 121 may evaluate these signals and decide to warn the driver 150 by providing a flashing light sequence upon a warning light mounted on the driver-side rear-view mirror. The flashing light sequence may be accompanied by audio beeps through the beeper 135 advising the driver 150 to either speed up or to slow down in order to bring the other vehicle in view on the rear-view mirror. The ultrasonic sensor 145 mounted upon the passenger-side rear-view mirror may operate in a similar manner.

The camera 130 mounted upon the front windshield of the vehicle 105 may be used in some cases to monitor an alertness state of the driver 150. The camera 130 may capture an image and/or a video clip of the face of the driver 150 and transmit the image and/or video clip to the driver warning system 120. The processor 121 may evaluate the image and/or video clip to evaluate the alertness state of the driver. If the evaluation indicates that the driver 150 is inattentive, the driver warning system 120 may try to alert the driver 150 by transmitting audio beeps through the beeper 135.

Other devices of a driver alertness monitoring system can include sensors, such as a pressure sensor 165 located upon the steering wheel of the vehicle 105. Upon detecting a lack of grip on the steering wheel, the pressure sensor 165 may transmit a signal to the driver warning system 120. The driver warning system 120 may alert the driver 150 by emitting audio beeps through the beeper 135 and/or by providing haptic signals through the steering wheel of the vehicle 105.

In one example method of operation in accordance with the disclosure, the driver warning system 120 may opt to obtain additional data from other sources upon receiving input from the lane crossing detector (not shown) and the pressure sensor 165. The additional data, may, for example, be obtained from the ultrasonic sensor 125 mounted upon the driver-side rear-view mirror, and/or from the ultrasonic sensor 145 mounted upon the passenger-side rear-view mirror. The driver warning system 120 may evaluate this additional data and determine that no vehicle is present in adjacent lanes on both sides of the vehicle 105. Accordingly, the driver warning system 120 may prioritize the haptic warning over the alert tone and may transmit the haptic warning first in an attempt to alert the driver 150. The driver warning system 120 may deem the second warning (pertaining to the lane drift condition) as unnecessary if the driver 150 becomes alert, tightens his/her grip on the steering wheel and corrects for the lane drift. If deemed necessary, the driver warning system 120 may issue the second warning at a later time.

In another example implementation, the priority list may be generated using objective data obtained by crowdsourcing from a number of vehicles. The vehicles may be communicatively interconnected with each other, and/or to infrastructure elements (such as cloud storage devices), using communication protocols such as, for example, a vehicle-to-vehicle (V2V) protocol, an infrastructure-to-vehicle protocol (I2V) protocol, a vehicle-to-everything (V2X) protocol, a Wi-Fi protocol, a Bluetooth® protocol, or any machine-to-machine protocol. The data gathered from the various vehicles can provide information pertaining to topics such as accidents, near-accidents, and conditions present during an accident. In one example case, crowdsourced vehicle data may provide information that a larger number of vehicles were involved in accident events under a certain type of situation (close tailgating, for example) in comparison to a number of vehicles involved in collision events under a different type of situation (blind spot driving, for example). In view of such information, the driver warning system 120 may use the priority list to prioritize a tailgating warning over a blind spot warning when the two conditions occur concurrently.

Figure 2:
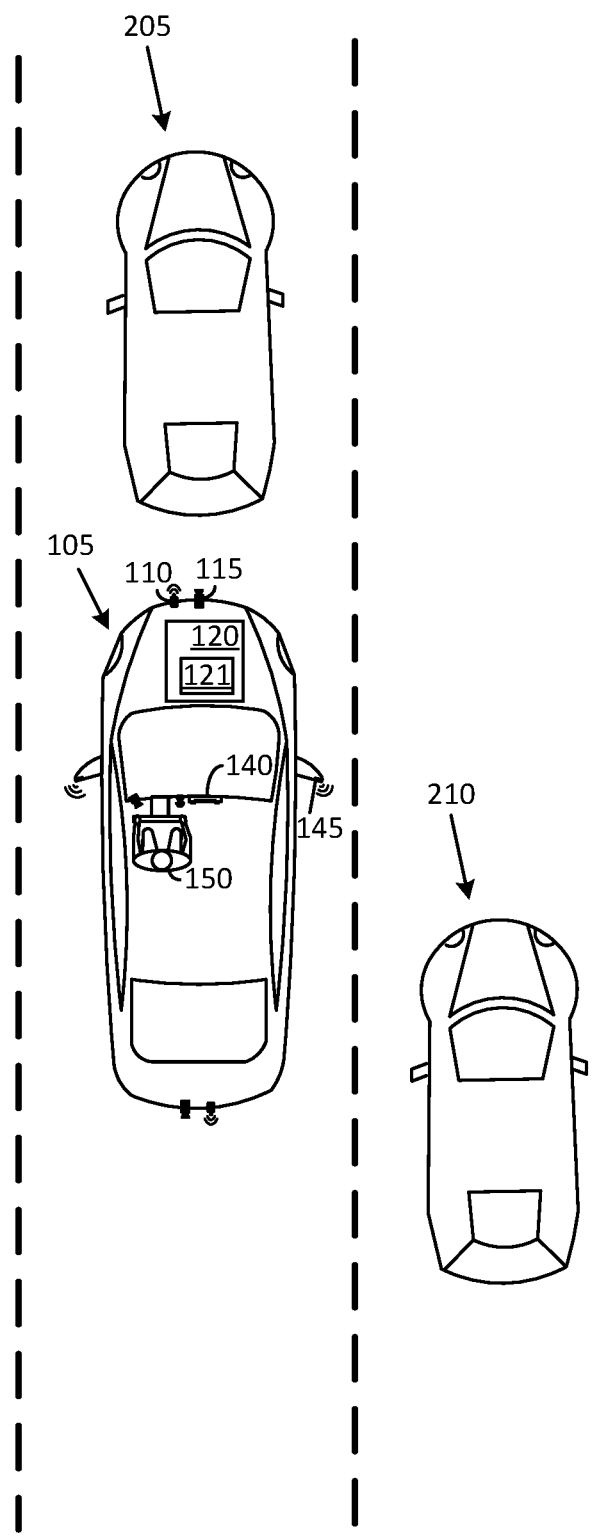
FIG. 2 illustrates a first example driving event that may be addressable by a driver warning system in accordance with the disclosure.

FIG. 2 illustrates a first example driving scenario that may be addressable by the driver warning system 120 in accordance with the disclosure. The driver 150 of the vehicle 105 is tailgating a vehicle 205 that is traveling ahead of the vehicle 105 in the same lane of an expressway. The radar sensor 110 mounted upon the front bumper of the vehicle 105 detects the vehicle 205 and transmits vehicle separation distance information to the driver warning system 120. The processor 121 of the driver warning system 120 evaluates the vehicle separation distance information for detecting an event that warrants a warning. The evaluation may be carried out, for example, by comparing the vehicle separation distance information to a threshold separation distance. The evaluation may indicate that the vehicle separation distance is less than the threshold separation distance and warrants a first driver warning being issued to the driver 150 of the vehicle 105.

At the same time, the ultrasonic sensor 145 mounted upon the passenger-side rear-view mirror of the vehicle 105 detects a vehicle 210 traveling in an adjacent lane in a driver blind spot. The ultrasonic sensor 145 transmits information to the driver warning system 120 about the presence of the vehicle 210 in the driver blind spot. The processor 121 of the driver warning system 120 determines that a second driver warning has to be issued to the driver 150 in addition to the first warning about the violation of the threshold separation distance. However, rather than providing both driver warnings concurrently, the processor 121 may refer to a priority list to make a determination as to which of the two driver warnings is to be assigned a higher priority.

Upon referring to the priority list, the driver warning system 120 may determine that the violation of the threshold separation distance between the vehicle 105 and the vehicle warrants a warning, whereas the presence of the vehicle 210 in the driver blind spot does not warrant a warning as long as the driver is not attempting to switch into the lane in which the vehicle 210 is traveling.

The driver warning may be issued, for example, in the form of a message displayed on the display screen of the infotainment system 140 recommending that the driver 150 increase the separation distance from the vehicle 205. The second driver warning pertaining to the vehicle 210 traveling in the driver blind spot may be deemed unnecessary by the processor 121 if the driver 150 slows down the vehicle 105, thereby causing the vehicle 210 to automatically move out of the driver blind spot.

The priority list referred to with respect to the scenario illustrated in FIG. 2, can be generated using crowdsourcing techniques such as those described above (driver-based and/or vehicle-based), and may include prioritization that is based on various threshold separation distances. For example, information obtained via crowdsourcing may provide an indication that a threshold separation distance of 10 feet or less (for example) led to a 50% increase in accident rates in comparison to accident rates associated with threshold separation distances that exceeded 10 feet.

Figure 3:
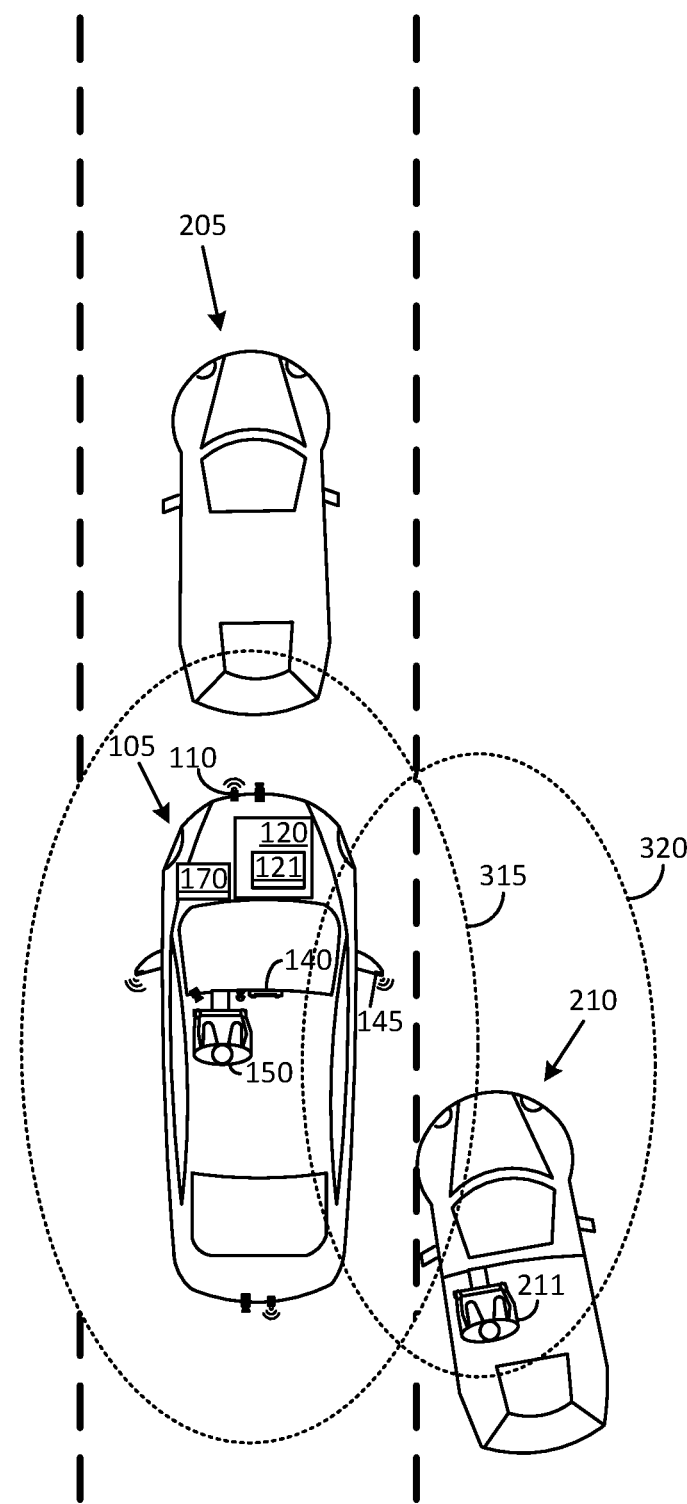
FIG. 3 illustrates a second driving event that may be addressable by a driver warning system in accordance with the disclosure.

FIG. 3 illustrates a second example driving scenario that may be addressable by the driver warning system 120 in accordance with the disclosure. The driver 150 of the vehicle 105 is tailgating the vehicle 205 that is traveling ahead of the vehicle 105 in the same lane of an expressway. The radar sensor 110 mounted upon the front bumper of the vehicle 105 detects the vehicle 205 and transmits vehicle separation distance information to the driver warning system 120. The processor 121 of the driver warning system 120 evaluates the separation distance information, for example, by comparing the vehicle separation distance to a first threshold separation distance. The first threshold separation distance is indicated by a dashed line 315. The dashed line 315 has an oval shape in this example implementation and can have other shapes in other implementations (rectangle, square, asymmetric, etc.). The evaluation by the processor 121 may indicate that the vehicle separation distance information between the vehicle 105 and the vehicle 205 is less than the first threshold separation distance and warrants a first driver warning being issued to the driver 150 of the vehicle 105.

At the same time, the ultrasonic sensor 145 mounted upon the passenger-side rear-view mirror of the vehicle 105 detects a vehicle 210 traveling in an adjacent lane and moving into the lane in which the vehicle 105 is moving. The ultrasonic sensor 145 transmits information to the driver warning system 120 about a vehicle separation distance between the vehicle 105 and the vehicle 210. The processor 121 of the driver warning system 120 evaluates the separation distance information, for example, by comparing the vehicle separation distance to a second threshold separation distance. The second threshold separation distance is indicated by a dashed line 320. In some implementations, the second threshold distance may be the same as the first threshold distance and the dashed line 315 may be used for evaluation by the processor 121 in lieu of the dashed line 320. The processor 121 of the driver warning system 120 determines that a second driver warning has to be issued to the driver 150 along with the first driver warning. However, rather than providing both warnings concurrently, the processor 121 may make a determination as to which of the two warnings is to be assigned a higher priority.

In this example scenario, the processor 121 may refer to guidance and/or a priority list stored in a database (not shown). The guidance and/or priority list may indicate to the processor 121 that the violation of the first threshold separation distance between the vehicle 105 and the vehicle 205 presents an event that needs to be addressed first because of certain factors, such as, for example, traffic laws.

Accordingly, the driver warning system 120 transmits a driver warning, such as, in the form of a message displayed on the display screen of the infotainment system 140 recommending that the driver 150 increase the separation distance from the vehicle 205. Actions taken by the driver 150 in reaction to the issued driver warning may be evaluated by the driver warning system 120. The evaluation may be carried out by communicating with the vehicle computer 170.

The warning related to the vehicle 210 may be deemed unnecessary by the processor 121, if the driver 150 slows down the vehicle 105, thereby allowing the driver 211 of the vehicle 210 to either move in ahead of the vehicle 105 or to refrain from switching lanes.

The priority list referred to with respect to the scenario illustrated in FIG. 3 can be generated using driver-based and/or vehicle-based crowdsourcing techniques. The driver warning system 120 may refer to such a priority list and provide a driver warning that informs the driver 150 that historical data based on crowdsourcing indicates a higher incidence of accidents when tailgating.

Figure 4:
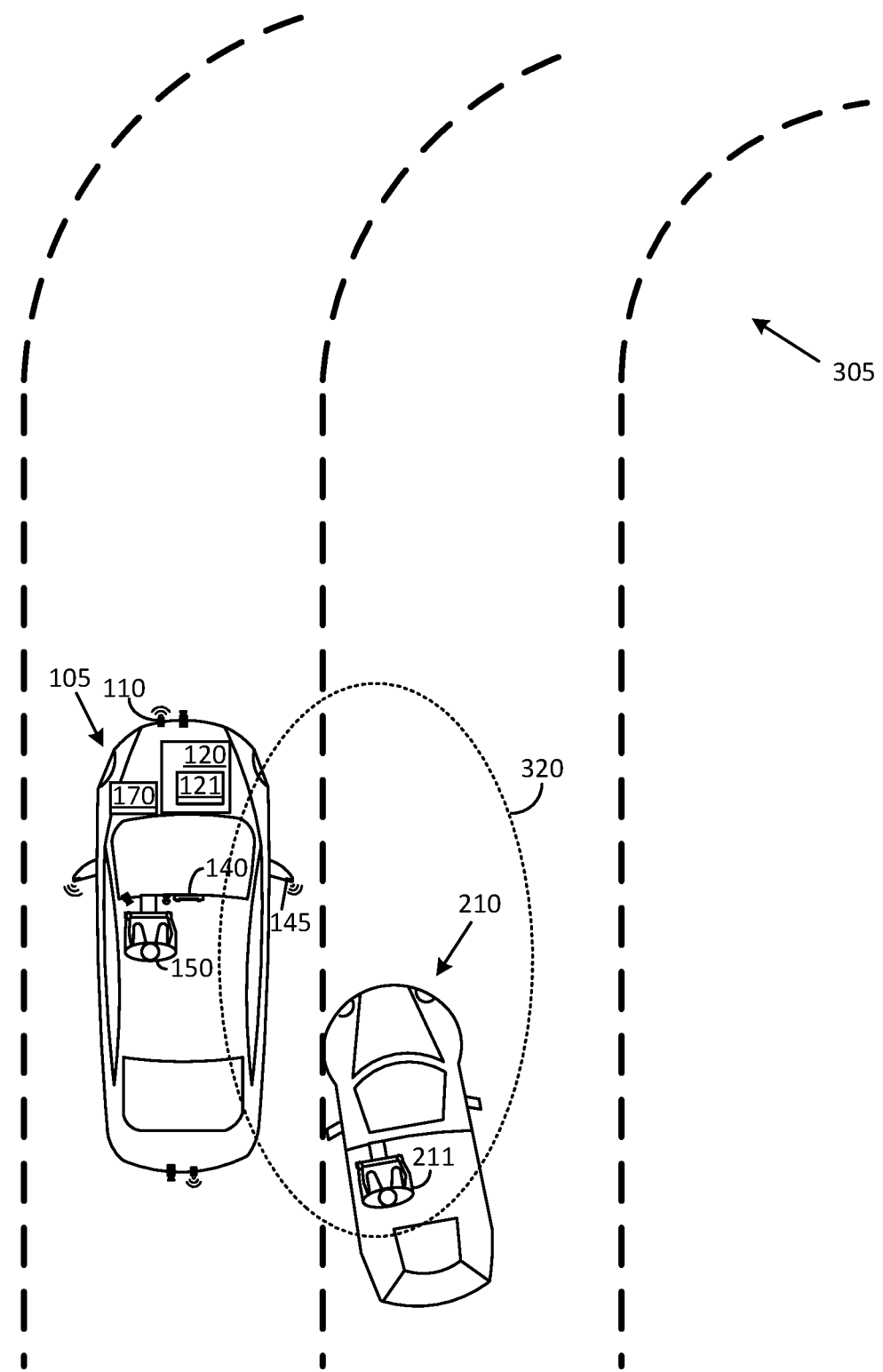
FIG. 4 illustrates a third example driving event that may be addressable by a driver warning system in accordance with the disclosure.

FIG. 4 illustrates a third example driving scenario that may be addressable by the driver warning system 120 in accordance with the disclosure. In this scenario, the vehicle 210 that is traveling in an adjacent lane is moving into the lane in which the vehicle 105 is moving. The processor 121 of the driver warning system 120 evaluates information provided by the ultrasonic sensor 145 and determines that a first driver warning has to be issued to the driver 150 about the approaching vehicle 210.

In this example scenario, there is no vehicle in front of the vehicle 105. However, the driver warning system 120 detects that there is a curve 305 in the road ahead. This detection may be carried out for example, by evaluating a video stream provided by the front-facing camera 115 or by utilizing map data that includes road metadata, such as road curvature. Upon detecting the curve 305, the driver warning system 120 may communicate with the vehicle computer 170 to obtain information about the current speed of the vehicle 105. The speed information may be evaluated by the processor 121 in conjunction with other parameters, such as, for example, road-related factors (recommended speed, curvature, length, gradient, etc.), weather factors (rainy, snowing, icy, etc.), vehicle characteristics (size, weight, and type of vehicle, etc.), and physical attributes of the driver 150. The evaluation may indicate that the speed of the vehicle 105 meets the threshold that warrants a warning for negotiating the curve 305 in the road ahead.

The driver warning system 120 may, at this time, refer to a priority list, and/or obtain historical data, to prioritize the warning related to the curve 305 in the road ahead, over the warning associated with the vehicle 210 approaching the vehicle 105. Based on the priority list and/or historical data, the driver warning system 120 may transmit a driver warning (such as, in the form of a message displayed on the display screen of the infotainment system 140) recommending that the driver 150 slow down. Actions taken by the driver 150 in reaction to the issued driver warning may be evaluated by the driver warning system 120 to determine if the other warning has to be issued. In one case, the driver 211 of the vehicle 210 may notice that the vehicle 105 is slowing down and may follow suit by slowing down and staying in his/her lane. In this case, the driver warning system 120 may deem the second warning unnecessary and refrain from issuing the warning.

Figure 5:
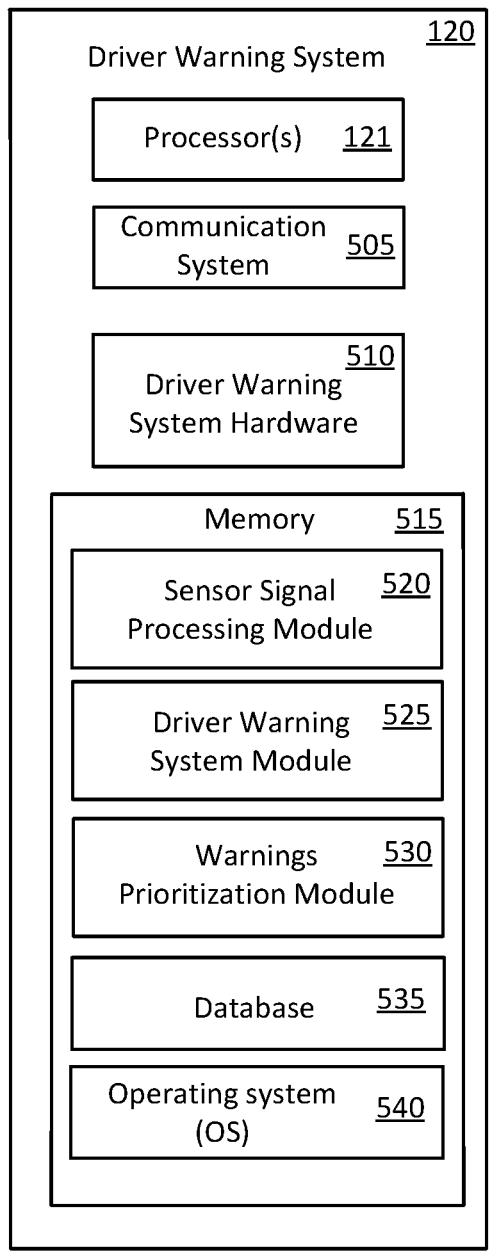
FIG. 5 shows some example components that can be included in a driver warning system in accordance with an embodiment of the disclosure.

FIG. 5 shows some example components that can be included in the driver warning system 120 in accordance with an embodiment of the disclosure. The driver warning system 120 may include a processor 121, a communication system 505, driver warning system hardware 510, and a memory 515. The communication system 505 can include a wireless transceiver that allows the driver warning system 120 to communicate with various devices in the vehicle 105 and outside the vehicle 105. The wireless transceiver may use any of various communication formats, such as, for example, a vehicle-to-everything (V2X) communication format, an Internet communications format, or a cellular communications format.

The driver warning system hardware 510 can include items, such as input/output interfaces that communicatively couple the driver warning system 120 to sensors and detectors in the vehicle 105. The sensors and detectors can include, for example, the rear-facing camera 155, the radar sensor 160, the front-facing camera 115, the radar sensor 110, the ultrasonic sensor 125, the ultrasonic sensor 145, and the camera 130.

The memory 515, which is one example of a non-transitory computer-readable medium, may be used to store an operating system (OS) 540, a database 535, and code modules, such as a sensor signal processing module 520, a driver warning system module 525, and a warnings prioritization module 530. The code modules are provided in the form of computer-executable instructions that can be executed by the processor 121 for performing various operations in accordance with the disclosure.

The sensor signal processing module 520 and the driver warning system module 525 may be executed by the processor 121 for receiving signals from the driver warning system hardware 510 and evaluating the signals for determination of events that warrant a warning. In one example scenario, the sensor signal processing module 520 may be executed by the processor 121 to process radar signals received from the radar sensor 110 mounted upon the front bumper of the vehicle 105 and from the ultrasonic sensor 145 mounted upon the passenger-side rear-view mirror of the vehicle 105 (illustrated in FIG. 3). The driver warning system module 525 may be executed in cooperation with the sensor signal processing module 520 to determine the vehicle separation distance between the vehicle 105 and the vehicle 205 and the separation distance between the vehicle 105 and the vehicle 210 traveling in the adjacent lane.

The processor 121 may compare the first vehicle separation distance to a first threshold separation distance and issues a driver warning if the first vehicle separation distance between the vehicle 105 and the vehicle 205 is less than the first threshold separation distance. The processor 121 may also compare the second vehicle separation distance to the second threshold separation distance and issue a driver warning if the second vehicle separation distance between the vehicle 105 and the vehicle 210 is less than the second threshold separation distance. The first threshold separation distance and the second threshold separation distance may be generated by the driver warning system module 525 based on historical data stored in the database 535 and/or on personal preferences of the driver 150.

In another scenario, the sensor signal processing module 520 and the driver warning system module 525 may be executed by the processor 121 to evaluate images received from the front-facing camera 115 and/or the rear-facing camera 155 (via the driver warning system hardware 510) in order to evaluate events within driving scenarios. Images provided by the front-facing camera 115 (in the form of a video stream, for example), may be evaluated by the sensor signal processing module 520 to identify the curve 305 in the road ahead as illustrated in FIG. 4. The driver warning system module 525 is executed in cooperation with the sensor signal processing module 520 to generate a driver warning in the manner described above upon identifying the curve 305. The warnings prioritization module 530 may be executed by the processor 121 to determine priorities of various driver warnings. The database 535 may include a priories list that is used by the processor 121 for this purpose.

Figure 6:
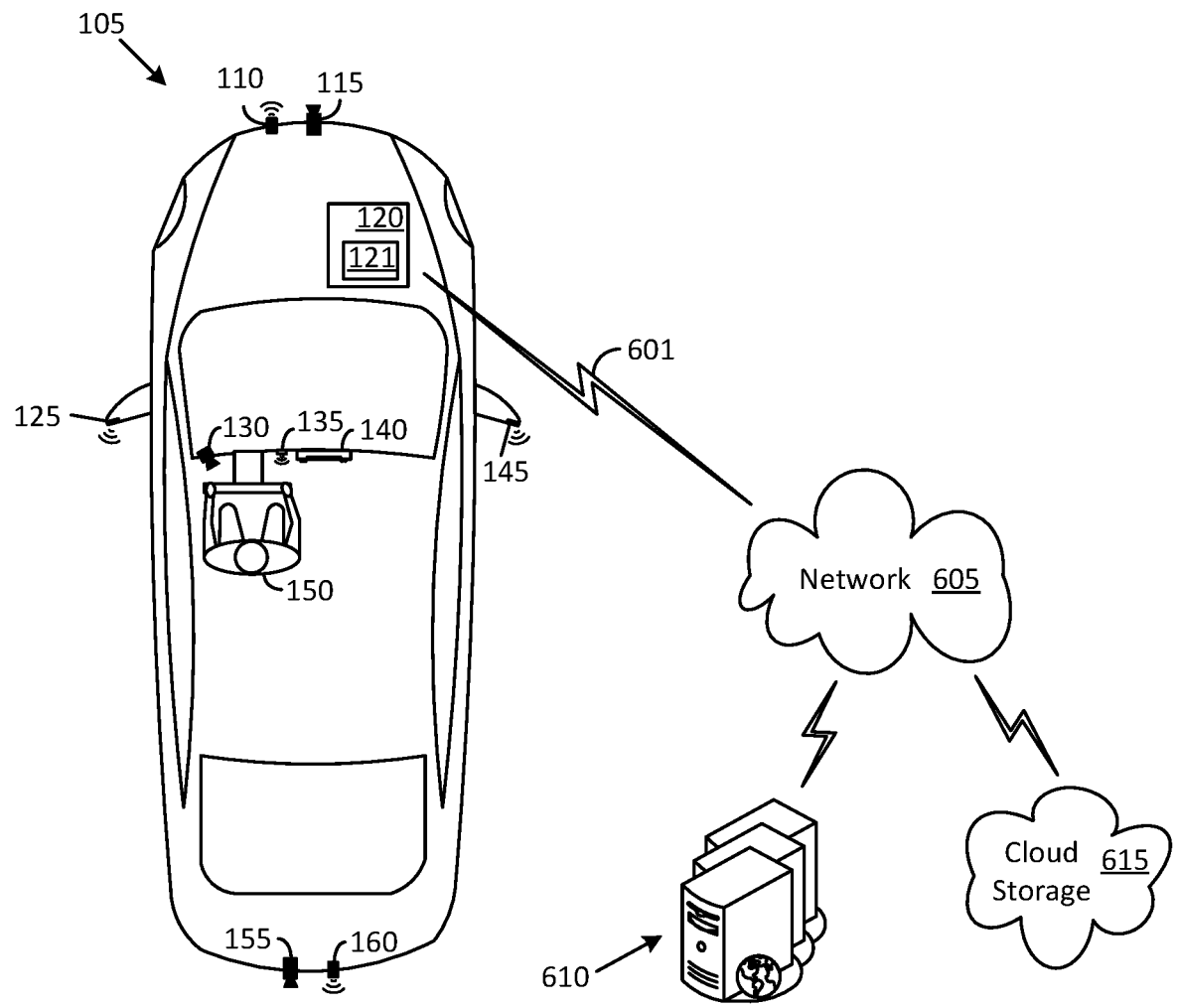
FIG. 6 illustrates a configuration that allows a driver warning system to communicate with external components for sharing information pertaining to driver warnings in accordance with an embodiment of the disclosure.

FIG. 6 illustrates a configuration that allows the driver warning system 120 to communicate with components outside the vehicle for sharing information pertaining to driver warnings in accordance with an embodiment of the disclosure. In this example, the driver warning system 120 is communicatively coupled via a network 605 to a server computer 610 and cloud storage 615.

The network 605 may include any one, or a combination of networks, such as a local area network (LAN), a wide area network (WAN), a telephone network, a cellular network, a cable network, a wireless network, and/or private/public networks, such as the Internet. For example, the network 605 may support communication technologies, such as TCP/IP, Bluetooth, cellular, near-field communication (NFC), Wi-Fi, Wi-Fi direct, machine-to-machine communication, and/or man-to-machine communication.

Some or all portions of a wireless communication link 601 that supports communications between the driver warning system 120 and a communication device, such as a router, for example, that may be included in the network 605, can be implemented using various types of wireless technologies, such as Bluetooth®, ZigBee®, or near-field-communications (NFC), cellular, Wi-Fi, Wi-Fi direct, machine-to-machine communication, man-to-machine communication, and/or a vehicle-to-everything (V2X) communication.

Information shared between the driver warning system 120, the server computer 610, and/or the cloud storage 615 can be bi-directional in nature. For example, in one case, driver warning information that may be useful to multiple drivers may be transferred from the driver warning system 120 in the vehicle 105 to cloud storage 615. Such information stored in cloud storage 615 may be accessed and used by driver warning systems of various vehicles.

In another case, driver warning information that is customized to the driver 150 may be transferred from the driver warning system 120 in the vehicle 105 to the server computer 610 and used by the driver warning system 120 for issuing customized warnings to the driver 150. In another case, the driver warning system 120 may obtain driver warning information stored in cloud storage 615 by other drivers or other entities.

The driver warning information and other information, such as traffic-related statistics and warning prioritization, stored in components, such as the server computer 610, cloud storage 615, and the database 535 of the driver warning system 120, can be generated in various ways. In one example implementation, an entity, such as a vehicle manufacturer or an original equipment manufacturer (OEM), can collect historical data from a number of highly connected vehicles, and/or via crowdsourcing from various drivers of various vehicles. Such information may be evaluated by various driver warning systems for defining various types of driver warning signals and assigning priority to the driver warning signals. The historical data, which can provide information regarding accidents, near misses, and normal driving actions, can include information, such as a sequence of events associated with an untoward traffic incident, weather conditions during the untoward traffic incident, accident statistics associated with a site of the untoward traffic incident, and/or information on a type of vehicle involved in the untoward traffic incident.

In one example implementation, various driver warning signals may be prioritized by evaluating a sequence of events leading up to a prior accident and/or a sequence of events leading up to prior avoidance of an accident. Such evaluation may not only provide information about the sequence of events, but also provide additional information, such as a high incidence of certain adverse events on a particular stretch of road, a frequency of occurrence of adverse events, and a time of day and/or weather conditions during occurrence of such adverse events.

A first example of a sequence of events leading to a prior accident may involve a vehicle speeding up in a blind spot of a neighboring vehicle when traveling on a windy road segment, thereby leading to a first type of side impact accident. A second example of a sequence of events leading to a prior accident may involve a vehicle speeding up in a blind spot of a neighboring vehicle on a road with poor lane markings during poor visibility (darkness, rain, snow, etc.), thereby leading to a side impact accident.

A third example of a sequence of events leading to avoidance of a prior accident may involve a vehicle speeding up in a blind spot of a neighboring vehicle on a road with poor lane markings, on a bright sunny day with good visibility. The drivers of the two vehicles may recognize the speed-up maneuver and take action to avoid an accident.

The driver warning system 120 can incorporate various techniques for evaluating historical data for purposes of generating priorities and recommendations associated with driver signal warnings. For example, the driver warning system 120 may use a machine learning model to evaluate historical data. Evaluating historical data may include the use of independent variables such as, for example, weather, road condition, and driver attributes, and may also include dependent variables such as, for example, whether an event led to an accident, and the proximity of neighboring vehicles during the occurrence of certain events (to determine near accidents). In one example implementation, a gradient boosting machine based on decision trees or random forest can be trained using various types of historical data to predict an untoward traffic incident. The training can include the use of parameters, such as time series signals, aggregations, mathematical formulae, and statistics (average, standard deviation, maximum, minimum, rate of change, etc.).

The driver warning system 120 may not only be provided driver warning signal priority information but may also be configured to evaluate signals from various devices in the vehicle 105 in order to execute certain actions in accordance with the disclosure. For example, the driver warning system 120 may be configured to evaluate signals received from the ultrasonic sensor 145 and/or the ultrasonic sensor 125 to determine parameters, such as a threshold distance with respect to a neighboring vehicle, a separation distance between the vehicle 105 and a neighboring vehicle, an angular orientation of a neighboring vehicle with respect to the vehicle 105. The driver warning system 120 may also be configured to interpret certain actions taken by drivers of other vehicles so as to provide preemptive warnings for a driver. For example, a change in speed of a neighboring vehicle and/or a lane switch of the neighboring vehicle to a different lane can be evaluated by the driver warning system 120 to detect a potential traffic incident ahead.

In some applications, a machine learning model may be used to identify characteristics of various untoward traffic incidents. The driver warning system 120 may be configured to display on the infotainment system 140, messages and information that are associated with a specific untoward event so as to alert the driver 150 to take evasive action. Two or more messages may be displayed sequentially rather than simultaneously, so as to allow the driver 150 to react to a prioritized event first before reacting to another event that occurs later. For example, if there is a first vehicle speeding up in a right-side adjacent lane of the vehicle 105 and a second vehicle is slowing down in a left-side adjacent lane of the vehicle 105, driver warnings provided to the driver 150 may be based on actions carried out by the first vehicle rather than by the second vehicle because the first vehicle may be moving into a blind spot of the driver 150. The warnings may be provided on the infotainment system 140 in some cases but may be issued in other formats on other components (beeper 135, or on a display in the rear-view side mirror) depending on factors, such as intensity of a warning, a priority of the warning with respect to other warnings that may or may not be pending, an alertness of the driver 150, a personal preference of the driver 150, and or ambient conditions.

The driver warning system 120 may take into consideration ambient conditions when issuing certain types of warnings. For example, in a scenario where vehicle 105 is approaching another vehicle to the front in the same lane of travel, the driver warning system 120 may issue a driver warning earlier when the roadway is wet rather than when the roadway is dry. In this example, the driver warning system 120 may account for the additional time and distance needed to reduce the speed of or stop the vehicle on a wet surface.

The driver warning system 120 may also take into consideration vehicle location information as a parameter for evaluating road conditions. The location information may be provided in various ways, such as, for example, GPS coordinates and identifiable physical characteristics, such as intersections, lane merges, and high curvature road edges. A learning model used by the processor 121 may learn local road features and road conditions that can be used by the system to issue warnings and provide other information to the driver 150. For example, if the vehicle 105 is coming up to a road segment with a curve in the road with a small radius of curvature, the driver warning system 120 may provide a type of warning that is different than a warning related to a pending accident. The warning may include information, such as, for example, lane-related information when two through-traffic lanes become exit-only lanes. In this way, the driver 150 is provided more time to carefully switch to an adjacent lane while watching out for high-speed traffic in the adjacent lane. Driver warnings provided by the driver warning system 120 may also include items, such as vehicle identification about other vehicles (for example, large semi traveling at high speed in adjacent lane).

The learning model used by the processor 121 may also be configured to learn from historical accident data. In some cases, the learning model can incorporate a supervised machine learning algorithm. The supervised learning model algorithm may eliminate unimportant or irrelevant data and use data that is particularly useful to the driver 150 of the vehicle 105. The supervised machine learning algorithm can be used to evaluate different types of vehicle accidents based on historical accident information.

In one example implementation, the supervised learning model algorithm may use driver feedback (explicit and/or implicit feedback) to customize and/or to refine generation and issuance of the driver warning signals. Refining driver warning signals can include eliminating issuance of some types of warnings, such as, for example, eliminating issuing of a driver warning to the driver 150 regarding a separation distance from the vehicle 210 traveling in the adjacent lane when the vehicle 210 is traveling in a parallel path and is not approaching vehicle 105 (even when violating the second threshold separation distance that is indicated by a dashed line 320 in FIG. 3). In some cases, a different driver may prefer to receive certain warnings that the driver 150 does not care for. Therefore, driver warning system 120 can be configured to learn global and driver-specific preferences. An example learning procedure may involve the use of crowdsourced data to generate a global model. The global model may be used, for example, to issue warnings that are tailored to individual drivers, based on their personal preferences.

The driver warning system 120 may also be configured to accept feedback from multiple drivers, such as, for example, to identify which driver warnings are more useful than others and/or which driver warnings are unnecessary or have nuisance value. In some cases, the driver warning system 120 may use an unsupervised machine learning algorithm to generate various driver groups based on individual driving characteristics. The driver 150 may be prompted to provide individual preferences and the vehicle can learn an individual profile with regard to what information is the most relevant to be displayed to the driver 150.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 515, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   detecting, by a first sensor in a first vehicle, a first driving event;
   detecting, by the first sensor or a second sensor in the first vehicle, a second driving event;
   determining a first driver warning associated with the first driving event and a second driver warning associated with the second driving event;
   generating, based on prioritizing the first driving event or the second driving event and at a first time, the first driver warning in the first vehicle instead of the second driver warning, wherein generating the first driver warning further comprises generating the first driver warning at a first location within the first vehicle for a driver; and
   generating, by a processor and at a second time, the first driver warning at a second location within the vehicle.

2. The method of claim 1, wherein the first driving event comprises a road condition or a weather condition, wherein the second driving event comprises a second vehicle violating a threshold separation distance between the first vehicle and the second vehicle, and wherein the second driving event is assigned a higher priority than the first driving event.

3. The method of claim 1, wherein the second driving event is assigned a higher priority than the first driving event based on historical data indicating that a likelihood that the first driving event will result in an untoward traffic incident is higher than a likelihood that the second driving event will result in an untoward traffic incident.

4. The method of claim 1, wherein the first driver warning includes a first type of driver warning or a second type of driver warning, and wherein producing the first driver warning further comprises producing the first type of driver warning instead of the second type of driver warning based on an indicated preference of a driver of the first vehicle.

5. The method of claim 1, wherein prioritizing the first driving event or the second driving event is based on historical data, wherein the historical data is derived from weather conditions in a locality, a number of accidents in the locality, information on a type of vehicle involved in accidents in the locality, and/or driving characteristics of drivers in the locality.

6. A method comprising:
   detecting, by a first sensor in a first vehicle, a first driving event associated with a first type of driver warning;
   detecting, by a second sensor in the first vehicle, a second driving event associated with a second type of driver warning;

receiving, from the second sensor, an indication of a condition associated with the second driving event;

generating, by a processor and at a first time, the first type of driver warning instead of the second type of driver warning based on receiving the indication of the condition associated with the second driving event, wherein generating the first type of driver warning further comprises generating the driver warning at a first location within the first vehicle; and generating, by a processor and at a second time, the first type of driver warning at a second location within the first vehicle.

7. The method of claim 6, further comprising:

detecting, by the first sensor or a second sensor in the first vehicle, a second driving event; and generating the driver warning based on prioritizing the first driving event or the second driving event.

8. The method of claim 7, wherein the first driving event comprises a road condition or a weather condition, wherein the second driving event comprises a second vehicle violating a threshold separation distance between the first vehicle and the second vehicle, and wherein the second driving event is assigned a higher priority than the first driving event.

9. The method of claim 8, wherein generating the first type of driver warning is further based on historical data, wherein the historical data comprises a sequence of events associated with an untoward traffic incident, weather conditions during the untoward traffic incident, accident statistics associated with a site of the untoward traffic incident, and/or information on a type of vehicle involved in the untoward traffic incident.

10. The method of claim 9, wherein the second driving event is assigned the higher priority based on the sequence of events associated with the untoward traffic incident providing information that a likelihood that the first driving event will result in an untoward traffic incident is higher than a likelihood that the second driving event will result in an untoward traffic incident.

11. The method of claim 7, further comprising:

prioritizing the first driving event or the second driving event based on evaluating historical data.

12. The method of claim 6, wherein generating the first type of driver warning at the first location is based on at least one of: an intensity of a warning, a priority of the first type of driver warning, an alertness of the driver, a personal preference of the driver, or an ambient condition.

13. A system in a first vehicle, the system comprising:

a memory that stores computer-executable instructions; and a processor configured to access the memory and execute the computer-executable instructions to:

receive an indication of a first driving event associated with a first type of driver warning and a second driving event associated with a second type of driver warning;

determine that the first driving event is associated with a higher priority than the second driving event; and generate a driver warning for the first driving event at a first time based on the the determination that the first driving event is associated with the higher priority than the second driving event, wherein the first type of driver warning is generated at a first location within the first vehicle; and generate a driver warning for the first driving event at a second time at a second location within the first vehicle.

14. The system of claim 13, further comprises a second sensor configured to detect a second driving event, and wherein the processor is configured to access the memory and execute computer-executable instructions to:

generate the driver warning based on prioritizing the first driving event or the second driving event.

15. The system of claim 14, wherein the first driving event comprises a road condition or a weather condition, wherein the second driving event comprises a second vehicle violating a threshold separation distance between the first vehicle and the second vehicle, and wherein the second driving event is assigned a higher priority than the first driving event.

16. The system of claim 15, wherein the processor is configured to access the memory and execute computer-executable instructions to:

receive historical data based in part on the first driving event and the second driving event, wherein the historical data comprises a sequence of events associated with an untoward traffic incident, weather conditions during the untoward traffic incident, accident statistics associated with a site of the untoward traffic incident, and/or information on a type of vehicle involved in the untoward traffic incident.

17. The system of claim 16, wherein the processor is configured to access the memory and execute computer-executable instructions to:

determine, based on historical data, that the second driving event precedes an accident.

18. The system of claim 16, wherein the historical data is derived from a driver of the first vehicle, multiple drivers of the first vehicle, and/or multiple drivers of multiple vehicles.

19. The method of claim 6 further comprising;

determining an action taken by a driver of the first vehicle subsequent to generating the first type of driver warning; and determining, based on the action, an absence of the first driving event and the second driving event.

20. The method of claim 1, further comprising:

receiving feedback from the driver;

training, based on the feedback, a supervised learning model; and generating, at a third time, and based on the supervised learning model, the first driver warning within the first vehicle.

\* \* \* \* \*